(No Model.)
F. A. PETTITT.
COTTON CHOPPER AND CULTIVATOR.
No. 277,777. Patented May 15, 1883.
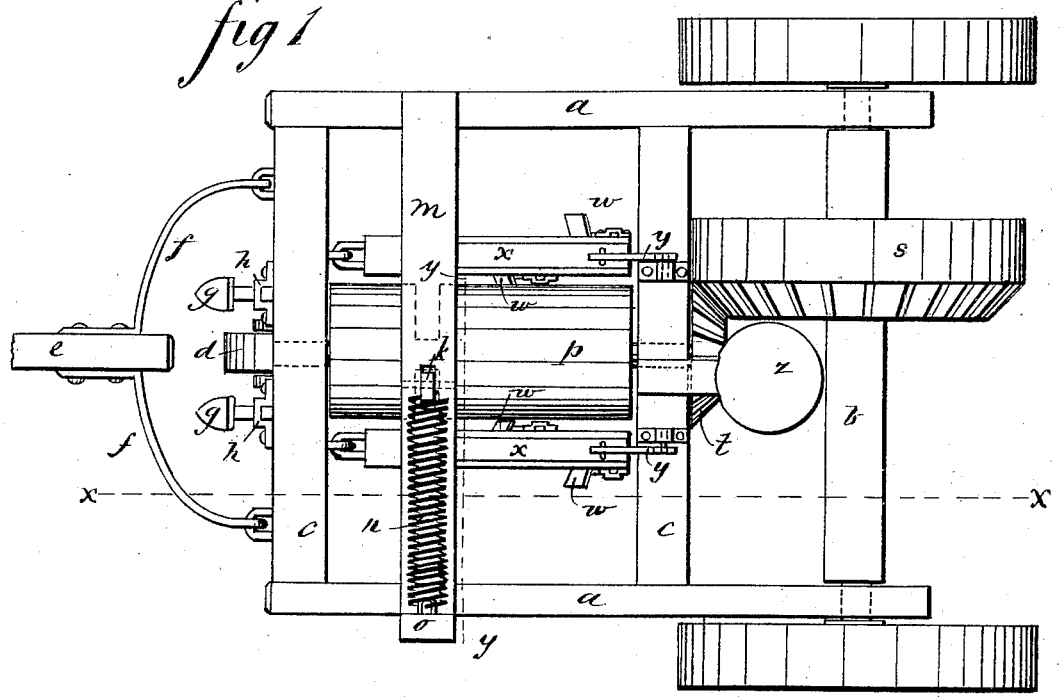
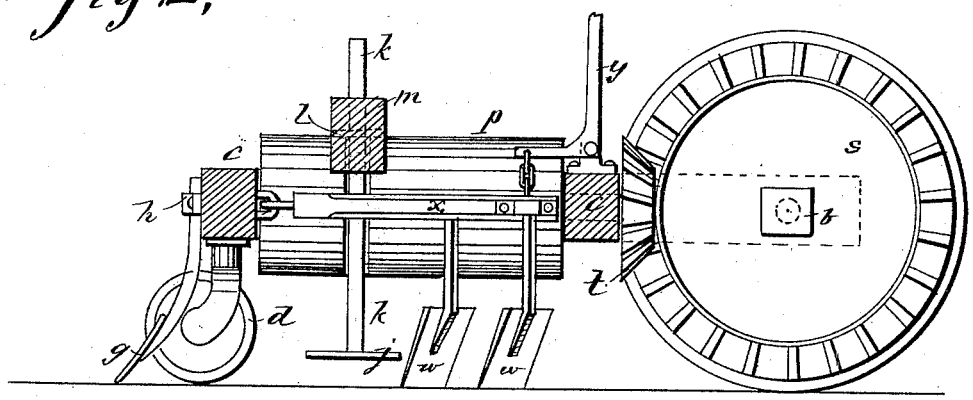
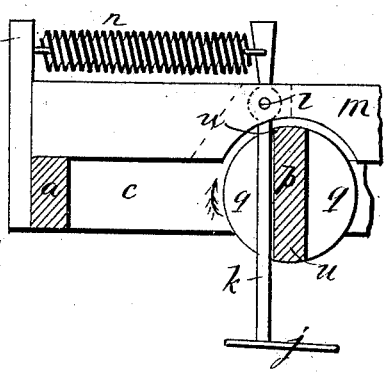
WITNESSES:
Chas. T. Howell,
C. Sedgwick
INVENTOR:
F. A. Pettitt
BY Munn & Co.
ATTORNEYS.

UNITED STATES PATENT OFFICE.

FRANCIS A. PETTITT, OF VALLEY MILLS, TEXAS.

COTTON CHOPPER AND CULTIVATOR.

SPECIFICATION forming part of Letters Patent No. 277,777, dated May 15, 1883.

Application filed January 27, 1883. (No model.)

*To all whom it may concern:*

Be it known that I, FRANCIS A. PETTITT, of Valley Mills, in the county of Bosque and State of Texas, have invented a new and Improved Cotton Chopper and Cultivator, of which the following is a full, clear, and exact description.

The object of the invention is to improve cotton-choppers, as hereinafter described, and pointed out in the claim.

Reference is to be had to the accompanying drawings, forming part of this specification, in which similar letters of reference indicate corresponding parts in all the figures.

Figure 1 is a plan view of my improved machine. Fig. 2 is a longitudinal sectional elevation of the machine on the line $x\,x$ of Fig. 1, and Fig. 3 is a detail in transverse section on line $y\,y$ of Fig. 1.

I make a rectangular frame of side pieces, $a$, resting at the rear ends on the axle $b$, and connected by cross-pieces $c$, of which the front one rests on a supporting-wheel, $d$, and has the tongue $e$ connected to it by the branches $f$.

The baring-off plows $g$, for scraping the weeds and other trash away from the sides of the plants, are attached to the front beam $c$ at equal distances from the center of the machine, the said plows being fastened by clamping-clips $h$, confining the stocks to the beam, so that they may be shifted up and down suitably for regulating the plows as to the depth they are required to work in the ground. The chopping-hoe $j$ is located a little distance behind the baring-off plows and a little to one side of the center of the machine, its handle $k$ being pivoted at $l$ to a cross-beam, $m$, placed upon the side beams, $a$, and above the pivot the handle has a strong spiral spring, $n$, connecting it to an upright, $o$, for throwing the hoe forward to chop out the plants. The hoe is pushed back by a roller, $p$, which is notched in the sides at $q$, to allow the hoe to be thrust forward by the spring twice in each revolution of the roller. The roller is geared with a driving-wheel, $s$, on the axle by a pinion, $t$, on it, and turns in the direction indicated by the arrow, so that when the angles $u$ of the notched part of the roller pass away from the handle the latter is left free to be thrust forward and swing the hoe across the row to chop out a space.

The hilling and cultivating plows $w$ are connected to the beams $x$, located at the sides of the roller $p$, respectively, and hitched to the front beam $c$, so as to be drawn along the sides of the rows of plants suitably for hilling up the earth around them. At the rear ends the beams are connected to elbow-levers $y$, pivoted on the rear beam $c$ suitably for enabling the driver to swing them up out of the ground when required, said levers being located in suitable proximity to the seat $z$, on which the driver sits.

It will be seen that the machine is contrived for such simplicity of construction that it can for the most part be made by hands of ordinary skill, such as are generally available whenever such machines are required for use.

Having thus described my invention, what I claim as new, and desire to secure by Letters Patent, is—

The combination, with the chopper-handle $k$, of the notched roller $p$, the mortised cross-beam $m$, having the pivot $l$ across its mortise or hole, and the spring $n$, attached to an upright, $o$, and the handle $k$, whereby the chopper may be operated as described.

FRANCIS ALEXANDER PETTITT.

Witnesses:
 W. P. HATCHITT,
 R. A. PETERS.